United States Patent [19]
Lissaman et al.

[11] Patent Number: 5,082,079
[45] Date of Patent: Jan. 21, 1992

[54] PASSIVELY STABLE HOVERING SYSTEM

[75] Inventors: Peter B. S. Lissaman, Altadena; Herman M. Drees, Simi Valley; Charles J. Sink, Simi Valley; William D. Watson, Simi Valley, all of Calif.

[73] Assignee: Aerovironment, Inc., Monrovia, Calif.

[21] Appl. No.: 519,015

[22] Filed: May 4, 1990

[51] Int. Cl.⁵ .......................... B60V 1/11; B64C 29/00
[52] U.S. Cl. ...................................... 180/118; 180/119; 244/23 A; 244/12.5
[58] Field of Search ............... 180/116, 119, 120, 121, 180/123, 118, 117; 244/7 C, 12.4, 12.5, 21, 23 A, 23 D

[56] References Cited

U.S. PATENT DOCUMENTS

| | | |
|---|---|---|
| 2,953,320 | 9/1960 | Parry .................................... 180/117 |
| 3,700,189 | 10/1972 | Timperman ........................ 244/12.4 |
| 4,795,111 | 1/1989 | Moller ............................. 244/12.5 X |

Primary Examiner—Charles A. Marmor
Assistant Examiner—Kevin Hurley
Attorney, Agent, or Firm—William W. Haefliger

[57] ABSTRACT

A flight system capable of passively stable hover comprises an apparatus defining a vertical axis, and including multiple upright ducts spaced about the axis; fluid momentum generators in the ducts to effect flow of fluid downwardly in the ducts; and fluid flow deflector structure in the path of the downwardly flowing fluid, and angled to deflect the fluid flow away from the axis, in such manner as to provide stability in hover of the apparatus.

14 Claims, 2 Drawing Sheets

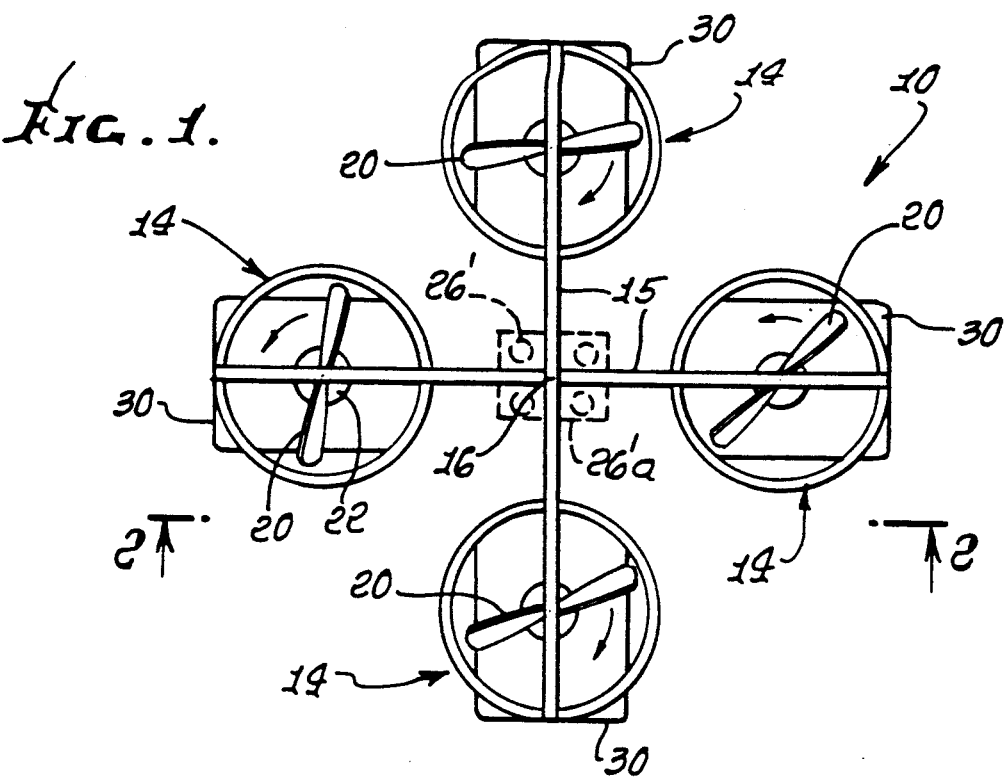
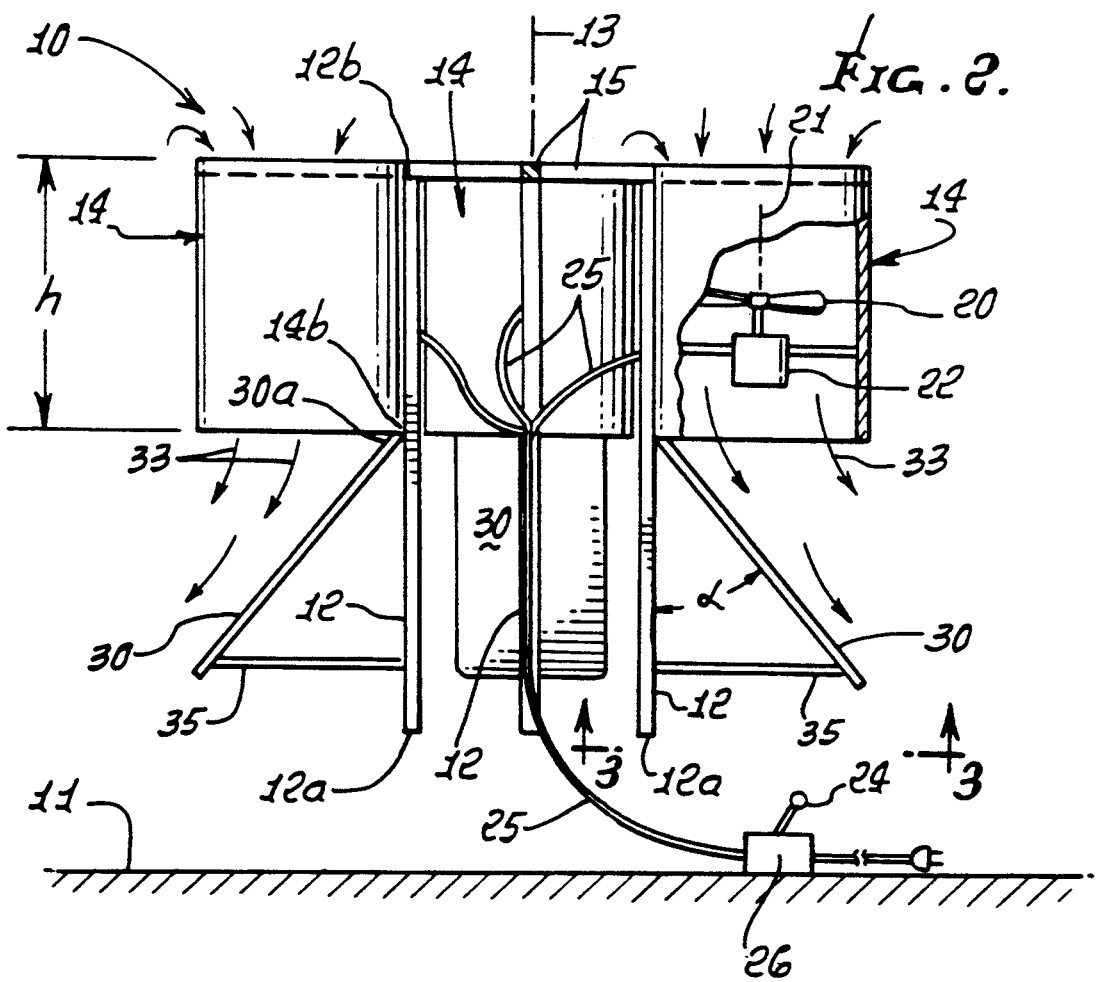

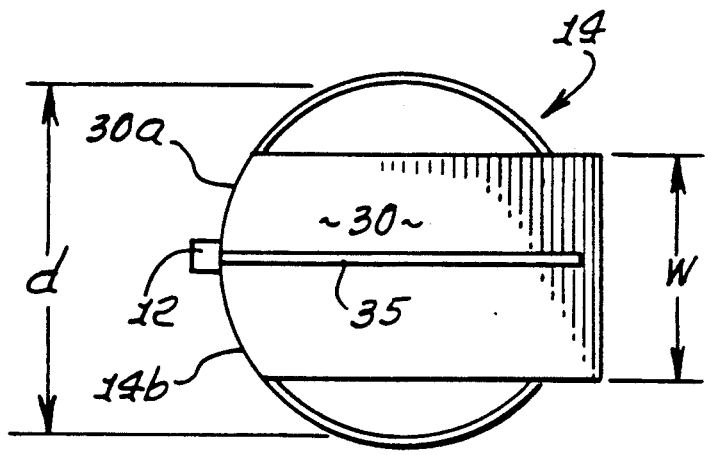
Fig. 3.
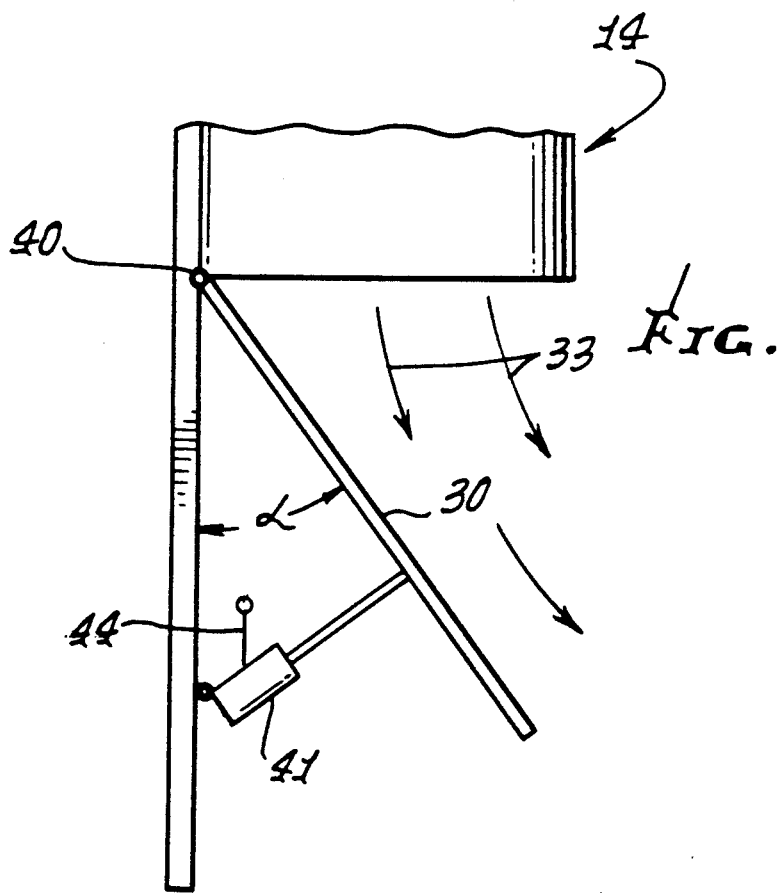
Fig. 4.
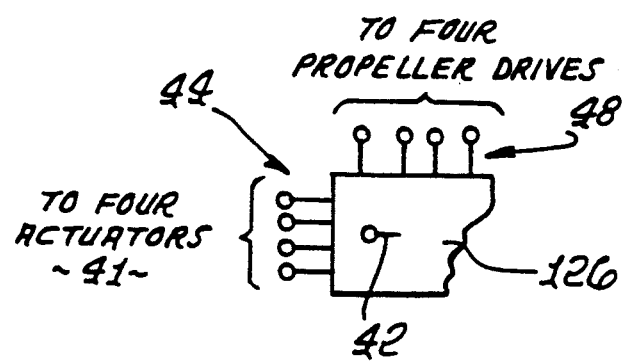

PASSIVELY STABLE HOVERING SYSTEM

BACKGROUND OF THE INVENTION

This invention relates generally to devices operating in air or water, and more particularly, to devices that are essentially passively stable in hover, i.e., self-stabilized against disturbances in any direction without need for active stabilizer mechanisms.

Devices that can hover in air or water are needed for many military and commercial applications. Vertical axis propeller systems can normally provide the thrust required to support the weight of the device, but many previous designs have proved to be naturally unstable, and have had to be stabilized by active stability systems. These usually incorporate motion sensors, such as accelerometers, gyroscopic sensors, complex electronic processing networks, and mechanical actuators to provide the actions to create the necessary stabilizing moments.

There is need for a simple, passively stable, hovering device that eliminates the requirement for auxiliary, active stabilizer means, as referred to.

SUMMARY OF THE INVENTION

It is a major object of the present invention to provide a simple, efficient flight system that is passively stable in hover which can operate in air or water. The air or water devices will involve different mechanizations to make allowance for the different properties of the two fluids, i.e., the specific structural design features will vary somewhat for air and water applications. Basically, in the hover mode, the device comprises:

(a) apparatus defining a vertical axis, and including multiple upright ducts spaced about the axis, (b) fluid momentum generator means in the ducts to effect flow of fluid downwardly in the ducts, (c) and fluid flow deflector means in the path of the downwardly flowing fluid, and angled to deflect the fluid flow away from the axis, in such manner as to provide stability.

As will be seen, the ducts have lower exit nozzles, and the deflector means typically includes plates projecting downwardly and sidewardly, from and below the duct lower exit nozzles. For best results, the plates may be attached to, or extend from, the duct lower exit nozzles, and they may extend at angles between 30° and 60° relative to vertical.

Another object of the invention is to provide the fluid momentum generator means in the form of propellers rotatable about axes substantially coincident with the duct axes. The drives for the propellers may comprise electrical motor means, but other means may be utilized. A flexible, umbilical electrical cable may be connected with the motor means, or electrical battery means carried by the craft may be employed.

Further, the fluid momentum generators may be controlled in power or rotational speed, or by adjusting pitch of the rotor blades of the generator to provide control of moment or force about all three axes of motion.

Further, the deflector plates, for best results, may be substantially flat, with widths less than duct diameter; and for directional flight control purposes, the plates may be controllably hinged to the ducts.

These and other objects and advantages of the invention, as well as the details of an illustrative embodiment, will be more fully understood from the following specification and drawings, in which:

DRAWING DESCRIPTION

FIG. 1 is a top plan view of one form of apparatus incorporating the invention;

FIG. 2 is an elevation taken on lines 2—2 of FIG. 1;

FIG. 3 is a bottom plan view taken on lines 3—3 of FIG. 2; and

FIG. 4 is a fragmentary side elevation of one air flow duct, of a group of same, with a controllable deflector plate.

DETAILED DESCRIPTION

In FIGS. 1-3, the passively stable hovering system 10 is shown in stable hovering position at a selected elevation above a surface 11. The system or apparatus 10 may have risen from surface 11 to selected elevation. Merely as illustrative, the apparatus may include support means adapted to engage the surface 11 prior to lift-off, such support means shown as multiple vertical struts 12 having lower ends or feet at 12a.

The apparatus 10 defines a vertical axis 13, and includes multiple upright ducts 14 spaced about that axis, as for example at equal angular intervals. Four such ducts are illustrated, but three or more may be utilized. The ducts may typically be cylindrical, and do not require equal inner diameters "d" and lengths or heights "h". Suitable structure interconnects the ducts to position them, and such structure is shown to include horizontal struts or members 15 joined at center 16. Members 15 extend across the tops 17 of the ducts and are joined thereto. Vertical struts 12 are shown as having their uppermost extents 12b joined to the members 15. Struts 12 extend adjacent the outer sides of the ducts closest to axis 13, and may be joined to the ducts to enhance apparatus strength. Other member and strut, or structure, configurations are possible.

In accordance with the invention, fluid momentum generator means is provided in the ducts to effect flow of fluid downwardly in and through the ducts. Such fluid momentum generator means is shown in the example to comprise propellers 20 rotatable about central vertical axes 21 in the ducts, i.e., substantially coincident with the duct axes. Drive means is or are provided to rotate the propellers, and may, for example, comprise electric motors 22 driving the propellers. The motor housings may be supported in the ducts by any means. Electrical power is supplied to the motors, as from a controllable power source 26 (see manual control 24) and via a flexible electrical "umbilical" cable or cables 25. In case electrical batteries are used, they may be carried directly by the hovering apparatus, as by a central strut. (Broken lines 26' in FIG. 1 indicate the possible position of such batteries in a pack 26'a.)

Further, in accordance with the invention, fluid flow deflector means is provided in the path of the downwardly flowing fluid, and angled to deflect the fluid flow away from said axis, in such manner as to provide stability.

For best results, the deflector means include flat plates 30, or plate surfaces, that project downwardly and sidewardly from and below duct lower exit nozzle 14b closest to the central axis 13, and at angles α relative to vertical. Angle α is between 30° and 60° for best results in terms of craft stability. The plates project downwardly away from axis 13. Resultant fluid flow is deflected as indicated by arrows 33.

The plates typically have width "w" less than the duct diameter d, i.e., W<d. If W>d, hover stability also occurs. Upper ends 30a of the plates may be connected to the lower end portions 14b of the ducts, as shown. Stability is lessened if the plate upper ends do not extend closely proximate the ducts. Lower or intermediate extents of the plates may be connected to struts 12, as via brace members 35.

Following these principles, a craft can be constructed to exhibit passive stability while hovering. Manual control 24 at power source 26 is adjustable to increase or decrease electrical power delivered to the propeller drives.

FIG. 4 shows a modification wherein the plates 30 are pivot or hinge connected to the duct lower ends, as at pivot locations 40. Actuators 41 are connected to the plates to control their angularity α, and thereby control craft flight direction. Note actuator pivot connectors to struts 12. A toggle 42 at power source 126 controls power to the actuators to control flight direction. See separate power cables 44 to the actuators. The toggle 42 may alternatively control power or propeller pitch to the four propeller drives, via cables 48, to control propeller differential operation for flight direction control.

When operating in the atmosphere, the fluid described herein consists of air; and when operating in liquid, the fluid typically consists of water.

I claim:

1. In a passively stable hovering system, the combination comprising:
   (a) apparatus defining a principal central axis in hover mode, and including multiple upright ducts spaced about said axis,
   (b) multiple fluid momentum generators, at least one in each of said ducts, to effect axial flow of fluid in the ducts,
   (c) and fluid flow deflector means extending in flow deflecting relation with said axially flowing fluid, and angled to deflect the fluid flow away from said central axis, in such manner as to provide stability,
   (d) said ducts having exit nozzles and said deflector means projecting axially and outwardly from the central axis and below each of said duct exit nozzles.

2. The combination of claim 1 wherein said deflector means comprise plates projecting axially and outwardly from and below said duct exit nozzles, and away from said central axis.

3. The combination of claim 2 wherein said plates are attached to the cut exit nozzles.

4. The combination of claim 3 wherein the plates extend at angles between 30° and 60° relative to said central axis.

5. The combination of claim 1 wherein said momentum generators comprise propellers rotatable about axes substantially coincident with duct axes.

6. The combination of claim 5 including drive means for rotating the propellers.

7. The combination of claim 6 wherein said drive means comprises at least one electric motor operatively connected with said propellers.

8. The combination of claim 7 including electrical cable means connected with said drive means to controllably supply electrical energy thereto.

9. The combination of claim 1 wherein there are four of said ducts equidistantly spaced from said central axis.

10. The combination of claim 2 wherein said plates are supported to have controllable angularity relative to said central axis and including control means for controlling said angularity.

11. The combination of claim 2 wherein said plates have widths less than the duct diameter.

12. The combination of claim 2 wherein said plates are substantially flat.

13. The combination of claim 1 including control means connected with said multiple fluid momentum generators to differentially control operation thereof for flight direction control.

14. The combination of claim 6 wherein said drive means includes at least one motor carried by said apparatus and operatively connected with said propellers.

* * * * *